United States Patent

Honda

[11] Patent Number: 4,945,275
[45] Date of Patent: Jul. 31, 1990

[54] ULTRASONIC DRIVING DEVICE
[75] Inventor: Keisuke Honda, Aichi, Japan
[73] Assignee: Honda Electric Co., Ltd., Aichi, Japan
[21] Appl. No.: 221,718
[22] Filed: Jul. 20, 1988
[30] Foreign Application Priority Data Jul. 26, 1987 [JP] Japan .................. 62-187340
Sep. 2, 1987 [JP] Japan .................. 62-219791

[51] Int. Cl.$^5$ .................................. H01L 41/08
[52] U.S. Cl. .......................... 310/323; 310/366; 310/333
[58] Field of Search ........... 310/323, 328, 365, 366, 310/333, 369

[56] References Cited

U.S. PATENT DOCUMENTS

| | | | |
|---|---|---|---|
| 4,019,073 | 4/1977 | Vishnevsky et al. | 310/328 X |
| 4,210,837 | 7/1980 | Vasiliev | 310/323 |
| 4,562,374 | 12/1985 | Sashida | 310/328 |
| 4,613,782 | 9/1986 | Mori et al. | 310/328 X |
| 4,634,916 | 1/1987 | Okada et al. | 310/317 X |
| 4,642,509 | 2/1987 | Kumada | 310/323 |
| 4,652,786 | 3/1987 | Mishiro | 310/333 |
| 4,663,556 | 5/1987 | Kumada | 310/323 X |
| 4,697,117 | 9/1987 | Mishiro | 310/328 X |
| 4,703,214 | 10/1987 | Mishiro | 310/328 |
| 4,723,085 | 2/1988 | Mukohjima et al. | 310/328 |
| 4,728,843 | 3/1988 | Mishiro | 310/328 X |
| 4,752,711 | 6/1988 | Tsukimoto et al. | 310/323 |

FOREIGN PATENT DOCUMENTS

| | | | |
|---|---|---|---|
| 0693493 | 10/1979 | U.S.S.R. | 310/323 |
| 0845198 | 7/1981 | U.S.S.R. | 310/328 |
| 0851560 | 7/1981 | U.S.S.R. | 310/323 |

Primary Examiner—Mark O. Budd
Attorney, Agent, or Firm—Burgess, Ryan and Wayne

[57] ABSTRACT

In the present invention, a stator consists of a piezoelectric vibrator having divided electrodes on at least one end, alternating current voltage is applied to each of the divided electrodes of one end and one electrode or each of the divided electrodes of the other end of the stator, and a member to be driven is placed on the end or side portion of the stator. The member is reversibly driven by a reversible circumferential progressive wave produced on the end and side portions.

14 Claims, 5 Drawing Sheets

ULTRASONIC DRIVING DEVICE

BACKGROUND OF THE INVENTION

The present invention relates to an ultrasonic driving device comprising a stator consisting of a ring type piezoelectric vibrator having divided electrodes in one end at least.

In a known ultrasonic motor using a piezoelectric vibrator, two groups of electrodes are attached to one end of a ring type piezoelectric ceramic vibrator, the two group of electrodes are so positioned that standing waves respectively generated by the two groups of electrodes are shifted every $\pi/2$ in each position. The parts of the ring type piezoelectric vibrator corresponding to the electrode are alternately polarized in reverse. Also, the two groups of the electrodes are respectively connected to two oscillators for respectively generating alternating current voltages having a $\pi/2$ phase shift from each other. When the altenating current voltages from the two oscillators are respectively applied to the two groups of electrodes, the two standing waves having a $\pi/2$ phase shift from each other generated on the surfaces of the ring type piezoelectric vibrator and then progressive waves owing to a compound of the two standing waves generated on the surfaces of the ring type piezoelectric vibrator. Therefore, when a rotary member is put on the ring type piezoelectric vibrator and the rotary member is strongly pressed to the ring type piezoelectric vibrator, the rotary member is rotated by the progressive waves.

In the prior ultrasonic motor, since the ring type piezoelectric vibrator must be polarized in many portions thereof and the oscillators must be connected to the electrodes, the construction of the ring type piezoelectric vibrator is complex and the cost of the ultrasonic motor becomes expensive.

SUMMARY OF THE INVENTION

It is, therefore, the primary object of the present invention to provide an ultrasonic driving device having a simple construction.

It is the another object of the present invention to provide an ultrasonic driving device having a stator consisting of a piezoelectric vibrator providing with divided electrodes at at least one end.

It is the another object of the present invention to provide an ultrasonic driving device having a stator consisting of a piezoelectric vibrator provided with divided electrodes at both ends.

In order to accomplish the above and other object, the present invention provides a stator consisting of a piezoelectric vibrator having divided electrodes at at least one end, alternating current voltage being applied to at least two electrodes, and a member to driven on one end or a side portion of the stator.

DESCRIPTION OF THE PREFERRED EMBODIMENTS

Figure 1:
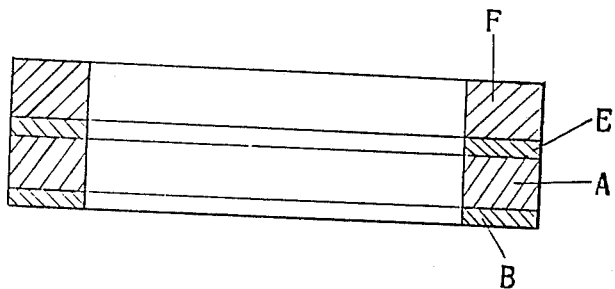
FIG. 1 shows a sectional view of an ultrasonic motor in the prior art.
Figure 2:
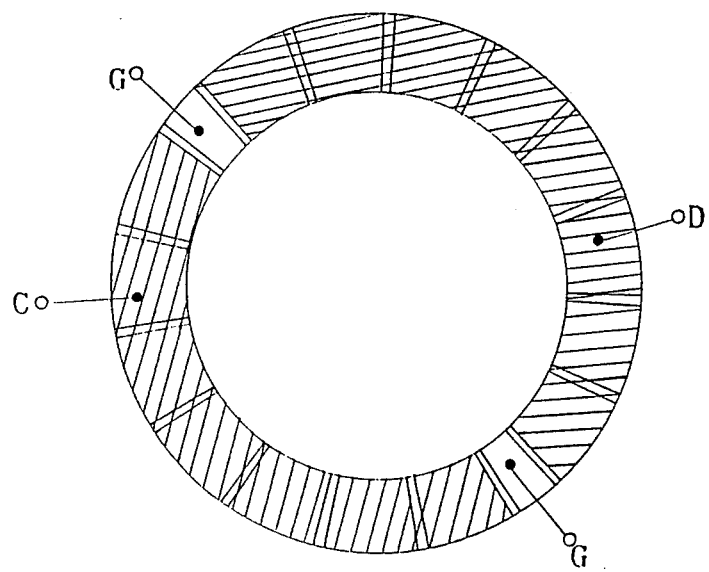
FIG. 2 shows a plane view of a form of a piezoelectric vibrator and a composition of electrodes of the piezoelectric vibrator in the ultrasonic motor in FIG. 1.

Referring to the prior art in FIG. 1, a ring type piezoelectric vibrator B is attached to a ring type resilient member A and the piezoelectric vibrator B vibrates with the resilient member. The piezoelectric vibrator B is divided in 17 parts by the ratio of e.g. 22.5° or 11.25°. The respective neighbouring portions in the 17 parts of the piezoelectric vibrator B are polarized with a reverse polarity from each other as shown in FIG. 2. The two portions C and D in one side of the piezoelectric vibrator B are respectively attached as an electrode by conductive paint as shown in FIG. 2. The portion G in FIG. 2 shows an earth electrode. The member F to be driven to which slider E is attached is mounted on the resilient member A.

In the ultrasonic motor in the prior art, the alternating current voltage of $V_0 \sin\omega t$ is applied to the one electrode C and the alternating current voltage $V_0 \cos\omega t$ is applied to the other electrode D, where $V_0$ is instantaneous value, $\omega$ is radian frequency and t is time. The phases of these voltages shift by $\pi/2$ from each other. Thereby, the divided portions of the piezoelectric vibrator B alternately produce expansion and contraction and thus, the resilient member A produces a bending vibration. Therefore, a standing wave is generated in the resilient member A and a progressive wave is generated on the resilient member A. Thus, the driven member F having the slider E is rotated on the resilient member A.

However, in the prior ultrasonic motor, because the divided portions of the ring type piezoelectric vibrator B must be alternately polarized and the divided electrodes must be formed on the divided portion of the piezoelectric vibrator B, the composition of the prior ultrasonic motor is complex.

Figure 3:
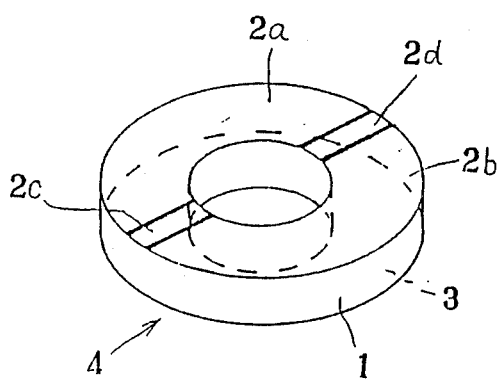
FIG. 3 shows a perspective view of a stator of an ultrasonic driving device of an embodiment in the present invention.

Referring to FIG. 3, in a stator consisting of a ring type piezoelectric vibrator in the embodiment of the present invention, divided electrodes 2a and 2b are provided with one end of a piezoelectric vibrator 1 and gaps 2c and 2d are put between the divided electrodes 2a and 2b. On the contrary, an electrode attached on the other end of the piezoelectric vibrator 1 is not divided.

In the above stator 4, when alternating current voltage is applied to the divided electrode 2a and electrode 3, a circumferential progressive wave progressing in one direction arises on the end portions and side portion of the stator 4. When alternating current voltage is applied to the divided electrode 2b and electrode 3, a circumferential progressive wave progressing in the other direction arises on the end portions and side portion of the stator 4.

Figure 4:
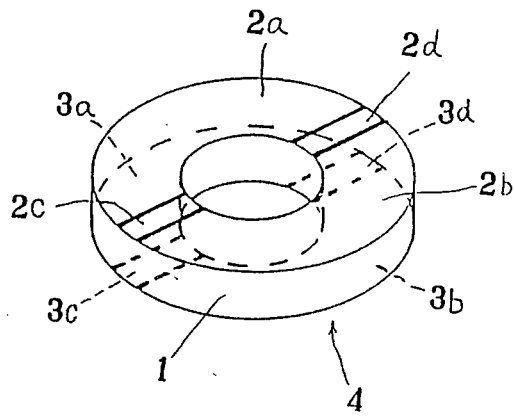
FIG. 4 shows a perspective view of a stator of an ultrasonic driving device of the other embodiment in the present invention.

Referring to FIG. 4, in a stator consisting of a ring type piezoelectric vibrator in an other embodiment of the present invention, divided electrodes 2a, 2b, 3a and 3b are respectively provided with both ends of the piezoelectric vibrator 1. Gaps 2c, 2d, 3c and 3d between the divided electrodes 2a, 2b, 3a and 3b are provided in parallel with each other both end portions of the vibrator 1.

In the stator 4 of the above embodiment, when the divided electrodes 2a and 3a are connected to each other, the divided electrodes 2b and 3b are connected to each other and alternating current voltage having a resonance frequency of the piezoelectric vibrator 1 is applied to divided electrodes 2a and 2b, and a circumferential progressive wave progressing in one direction arises on the end and side portions of the stator 4. When alternating current voltage shifted by a few frequencies from the above resonance frequency is applied to the electrodes 2a and 2b, a circumferential progressive wave progressing in the contrary direction arises on the end and side portions of the stator 4.

Figure 5:
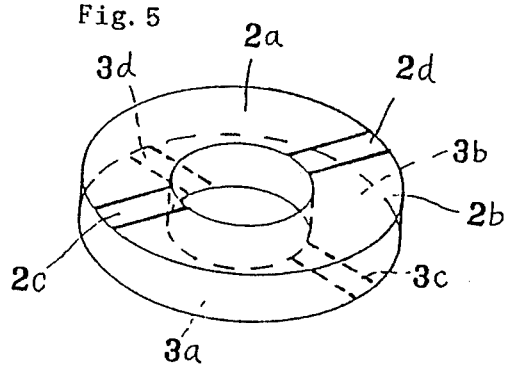
FIG. 5 shows a perpective view of a stator of an ultrasonic driving device of the furthermore embodiment in the present invention.

Referring to FIG. 5, in a stator consisting of a ring type piezoelectric vibrator in an other embodiment of the present invention, divided electrodes 2a, 2b, 3a and 3b are provided with both end of the piezoelectric vibrator 1 and gaps 2c, 2d, 3c and 3d between the divided electrodes 2a, 2b, 3a and 3b are shifted by 90° from each other.

In the stator 4 of the above embodiment, when the divided electrodes 2a and 3a are connected to each other, the divided electrodes 2b and 3b are connected to each other and alternating current voltage having a resonance frequency of the piezoelectric vibrator is applied to divided electrodes 2a and 2b, and a circumferential progressive wave progressing in one direction arises on the end and side portions of the stator 4. When the divided electrodes 2a and 3b are connected to each other, the divided electrodes 2b and 3a are connected to each other and alternating current voltage having a resonance frequency is applied to divided electrodes 2a and 2b, and a circumferential progressive wave progressing in the contrary direction arises on the end and side portions of the stator 4.

Figure 6A:
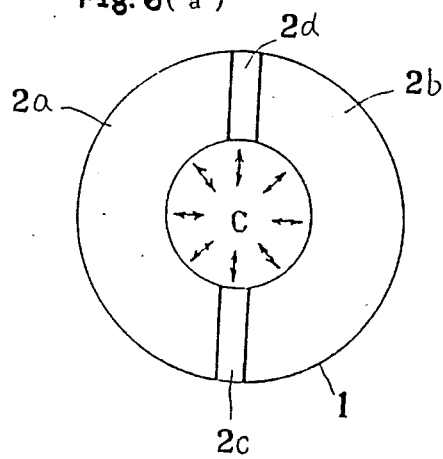
FIG. 6 (a) and (b) show a view for explaining a operating principle of the present invention.
Figure 6B:
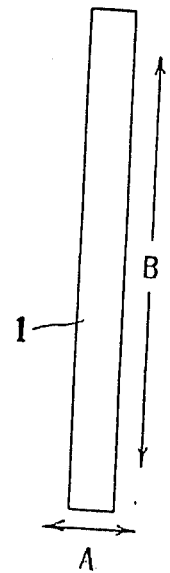

Explaining the operation for generating the circumferential progressive wave, when the alternating current voltage is applied to the piezoelectric vibrator, since a thickness vibration arises such as in arrow A and a longitudinal vibration arises such as in arrow B as shown in an enlarged view of a half part of the piezoelectric vibrator in FIG. 6 (b) and a radial vibration arises as shown by an arrow C in FIG. 6 (a), the circumferential progressive wave arises due to a combination of these three vibrations.

Figure 7:
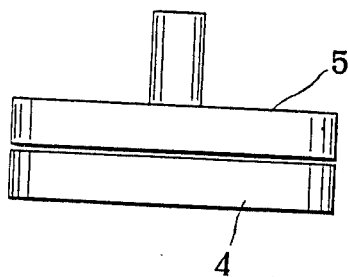
FIG. 7 shows a side view of an embodiment of an ultrasonic driving device using a stator according to the present invention.

As shown in FIG. 7, when a member 5 to be driven is pressed on the stator 4 which produces the circumferential progressive wave, the member 5 is reversibly rotated by the circumferential progressive waves produced due to the decided frequency of the alternating current voltage and the connection of the electrodes 2a, 2b, 3a, and 3b for applying the voltage.

Figure 8:
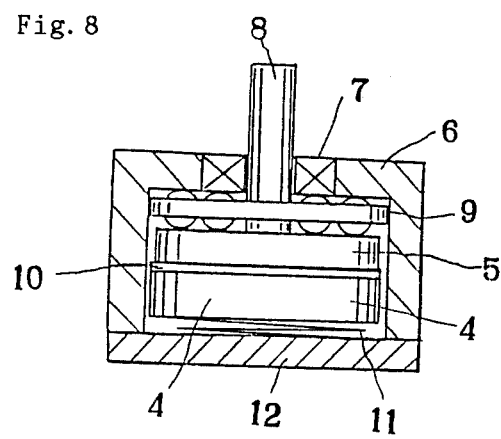
FIG. 8 shows a side view of the other embodiment of an ultrasonic driving device using a stator according to the present invention.

Referring to FIG. 8, in an ultrasonic driving device in an other embodiment according to the present invention, a bearing 7 is arranged in the end of a case 6 and a rotary shaft 8 of the member 5 to be driven is supported with the bearing 7. A thrust bearing 9 is arranged between the case 6 and member 5 so as to rotate against thrust pressure. Also, a wear-resisting member 10 is put between the member 5 and stator 4, and a bottom member 12 is fixed in a bottom portion of the case 6 and presses the stator 4 by a spring 11.

In the ultrasonic driving device composed as shown above, since the member 5 is reversibly rotated by the supply of the voltage, this device is used as an electric motor.

Figure 9:
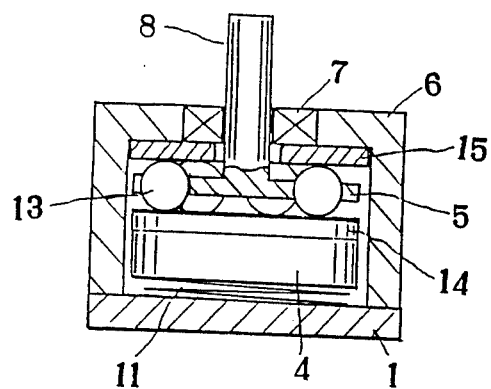
FIGS. 9 shows a side view of the furthermore embodiment of an ultrasonic driving device using a stator according to the present invention.

Referring to FIG. 9, in the ultrasonic driving device of an other embodiment according to the present invention, a bearing 7 is arranged in the end portion of a case 6 and a rotary shaft 8 of the member 5 to be driven is supported with the bearing 7. A plurality of balls 13 are rotatably supported with the member 5 and are put between a supporting plate 14 arranged in the case 6 and a contact plate 15 on the stator 14. A bottom member 12 is fixed in the bottom portion of the case 6 and then presses the stator 4 through a spring 11.

In the ultrasonic driving device according to the present invention, also since the member 5 is reversibly rotated by the supply of the alternating current voltage, this device is used as an electric motor.

The ultrasonic driving device as stated above shows only a few examples and other compositions are thought. Even if the shifts of gaps 2c, 2d, 3c and 3d between the electrodes 2a, 2b, 3a and 3b of the piezoelectric vibrator 1 are shown only as to 0° and 90°, these shifts can be changed by 1° or more.

Figure 10:
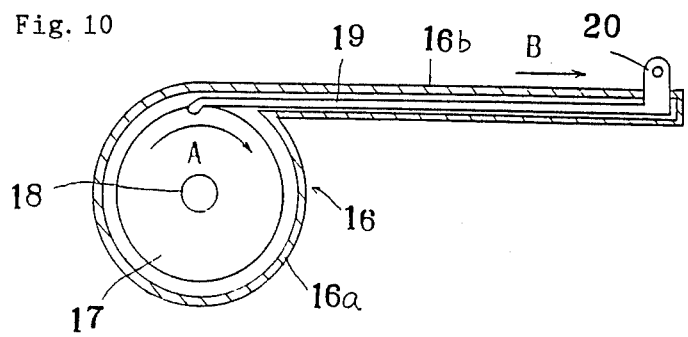
FIG. 10 shows a side view of an embodiment of an ultrasonic linearly driving device using a stator according to the present invention.
Figure 11:
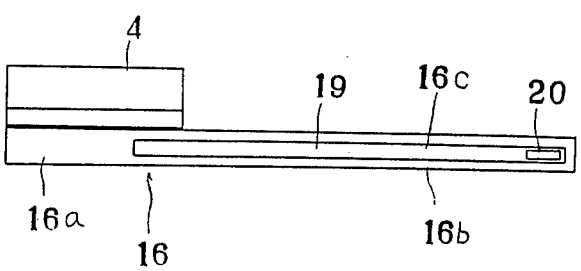
FIG. 11 shows a plane view of an ultrasonic linearly driving device of FIG. 10.

Referring to FIG. 10 and FIG. 11, in an ultrasonic driving device of an other embodiment according the present invention, a case 16 has a rotary portion 16a and a guide portion 16b linearly elongating from the rotary poriton 16a toward a tangent line. Then a rotary disc 17 is rotatably supported in the rotary portion 16a by a rotary shaft 18. One end of a flexible metal or resin belt 19 is fixed with the rotary disk 17 and a connecting member 20 is attached with the other end of the belt 19 and protrudes from a slot 16c formed in the guide portion 16b. A stator 4 is attached to the side portion of the case 16 and the rotary shaft of a member to be driven in the stator 4 is connected with the rotary shaft 18 of the rotary disk 17.

Figure 12:
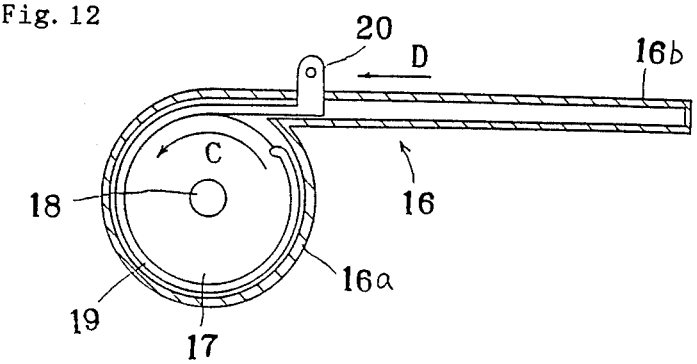
FIG. 12 shows a view for explaining a operation principle of the device of FIG. 10.

In the ultrasonic linear driving device, when the rotary disk 17 is rotated toward an arrow A, the connecting member 20 is linearly moved toward an arrow B as shown in FIG. 10. Also, when the rotary disk 17 is rotated toward an arrow C as shown in FIG. 12, the belt 19 is wound on the rotary disk 17 and the connecting member 20 is moved toward an arrow D.

In this embodiment, since the connecting member 20 of the belt 19 is linearly moved by the rotation of the rotary disk 17 and is stopped in a desired position by of the stator 4 of the ultrasonic driving device, this device is used as a linear actuator or a solenoid actuator.

Figure 13:
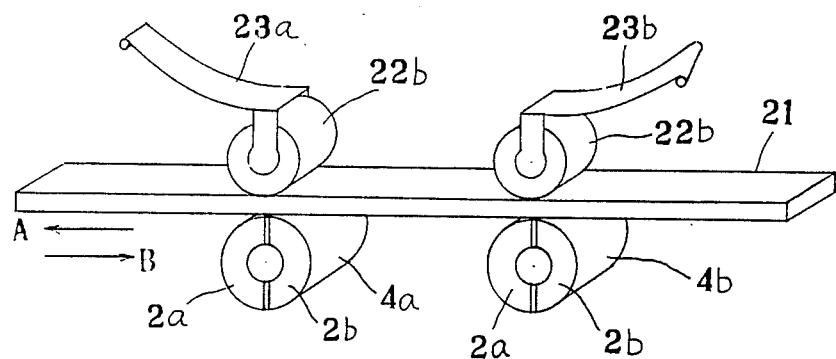
FIG. 13 shows a perspective view of an embodiment of an ultrasonic linearly driving device using a stator according to the present invention.

Referring to FIG. 13, in an ultrasonic driving device of an other embodiment using the stator of the present invention, stators 4a and 4b respectively having electrodes 2a and 2b on one end and electrodes 3 or 3a and 3b on the other end are fixed on a supporting base by means of screws passing through holes of the stators respectively. Then a member 21 comprises of a long plate is put on the stators 4a and 4b, supporting rollers 22a and 22b which are supported by springs 23a and 23b are put on the opposed positions of the stators 4a and 4b and press the member 21 by springs 23a and 23b supported by the supporting base.

In this ultrasonic driving device, when stators 4a and 4b are driven, the member 21 to be driven is linearly moved toward an arrow A or B by the means of connection of the electrodes for supplying the alternating current voltage. In the above embodiment, the stator 4a or 4b may be changed by a roller if desired.

Figure 14:
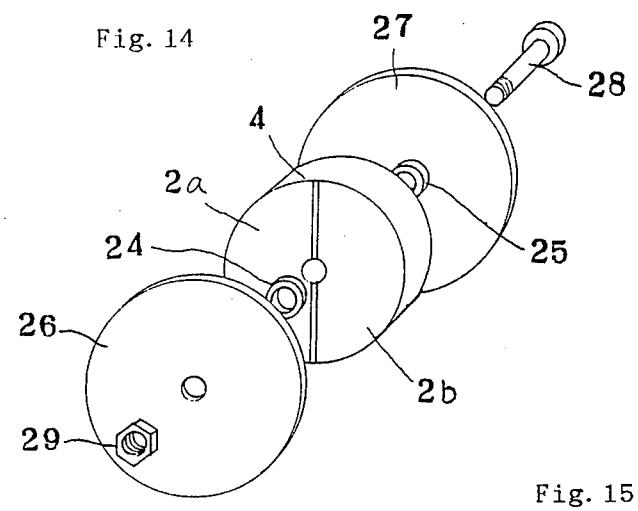
FIG. 14 shows a resolved perspective view of an stator of the other embodiment of an ultrasonic driving device according to the present invention.

Referring to FIG. 14, in a stator of an other embodiment of the present invention, stoppers 26 and 27 are fixed through washers 24 and 25 on both ends of a stator 4 respectively having electrodes 2a and 2b on one end and electrodes 3 or 3a and 3b on the other end by means of a bolt 28 and nut 29.

Figure 15:
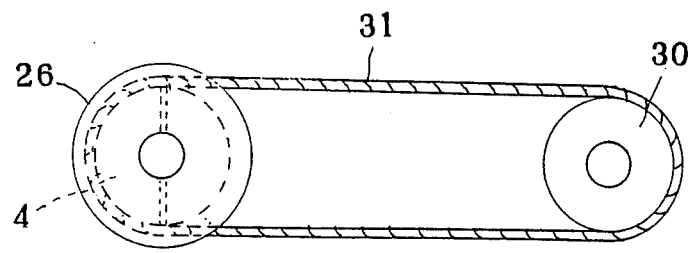
FIGS. 15 shows a side view of the embodiment of an ultrasonic driving device according to the present invention.

As shown in FIG. 15, a metal chain 31 is hung on the stator 4 and a roller 30.

In the above ultrasonic driving device, when the stator 4 is driven, the chain 31 is driven by the circumferential progressive wave, whereby the roller 30 is driven.

What is claimed is:

1. An ultrasonic driving device comprising:
a stator including a ring type piezoelectric vibrator having divided first electrodes on one end thereof and a second electrode on an opposite end thereof,
a member to be driven on one end portion or side portion of the stator, and
AC voltage supply means for supplying an AC voltage to only one first divided electrode and to the second electrode.

2. An ultrasonic driving device as set forth in claim 1 wherein a wear-resisting member is put between the member to be driven and the stator.

3. An ultrasonic driving device comprising:
a stator including a ring type piezoelectric vibrator having divided electrodes at both ends thereof, wherein gaps provided between the divided electrodes on both ends of the piezoelectric vibrator are shifted from each other by 45°.
a member to be driven on an end or side portion of the stator, and
AC voltage supply means for supplying an AC voltage to less than all the divided electrodes of both ends.

4. An ultrasonic driving device comprising:
a stator including a ring type piezoelectric vibrator having divided electrodes at both ends thereof, wherein gaps provided between the divided electrodes on both ends of the piezoelectric vibrator are shifted from each other by 90°.
a member to be driven on an end or side portion of the stator, and
AC voltage supply means for supplying an AC voltage to less than all the divided electrodes of both ends.

5. An ultrasonic driving device according to claim 1, further including a case, the ring type piezoelectric vibrator being provided in the case, and a member to be driven contacted with the stator through a wear-resisting member having pressure applied by a spring.

6. An ultrasonic driving device according to claim 1, further including a case, the ring type piezoelectric vibrator being arranged in the case, and a member to be driven including a rotary member having a plurality of balls contacted with the stator by pressure applied by a spring.

7. An ultrasonic driving device according to claim 1, further including a case having a rotary portion and a guide portion, the ring type piezoelectric vibrator being arranged in the case, a rotary member arranged in the rotary portion of the case and rotated by a circumferential progressive wave on the stator, and a belt arranged in the guide portion, one end of the belt being fixed on the rotary member and the other end of the belt being attached to a connecting member and the connecting member being moved in a slot of the guide portion.

8. An ultrasonic driving device according to claim 1, further including a second said stator, a linear member put on the stators, and two rollers for pressing the linear member by springs, whereby the linear member is linearly moved by the circumferential progressive wave produced on the stators.

9. An ultrasonic driving device according to claim 1, further including two stoppers attached on both ends of the piezoelectric vibrator through washers, a roller arranged in a position spaced from the stator, and a chain hung on the stator and the roller, whereby the chain is driven by the circumferential progressive wave of the stator and the roller is rotated by movement of the chain.

10. An ultrasonic driving device comprising:
a stator including a ring type piezoelectric vibrator having divided electrodes at both ends thereof,
a member to be driven on an end or side portion of the stator,
AC voltage supply means for supplying an AC voltage to less than all the divided electrodes of both ends,
a case, the ring type piezoelectric vibrator being provided in the case, and
a member to be driven contacted with the stator through a wear-resisting member having pressure applied by a spring.

11. An ultrasonic driving device, comprising:
a stator including a ring type piezoelectric vibrator having divided electrodes at both ends thereof,
a member to be driven on an end or side portion of the stator,
AC voltage supply means for supplying an AC voltage to less than all the divided electrodes of both ends,
a case, the ring type piezoelectric vibrator being arranged in the case, and
a member to be driven including a rotary member having a plurality of balls contacted with the stator by pressure applied by a spring.

12. An ultrasonic driving device comprising:
a stator including a ring type piezoelectric vibrator having divided electrodes at both ends thereof,
a member to be driven on an end or side portion of the stator, AC voltage supply means for supplying an AC voltage to less than all the divided electrodes of both ends, a case having a rotary portion and a guide portion, the ring type piezoelectric vibrator being arranged in the case, a rotary member arranged in the rotary portion of the case and rotated by a circumferential progressive wave on the stator, and a belt arranged in the guide portion, one end of the belt being fixed on the rotary member and the other end of the belt being attached to a connecting member and the connecting member being moved in a slot of the guide portion.

13. An ultrasonic driving device comprising:

a stator including a ring type piezoelectric vibrator having divided electrodes at both ends thereof, a member to be driven on an end or side portion of the stator, AC voltage supply means for supplying an AC voltage to less than all the divided electrodes of both ends, a second said stator, a linear member put on the stators, and two rollers for pressing the linear member by springs, whereby the linear member is linearly moved by the circumferential progressive wave produced on the stators.

14. An ultrasonic driving device comprising:

a stator including a ring type piezoelectric vibrator having divided electrodes at both ends thereof, a member to be driven on an end or side portion of the stator, and AC voltage supply means for supplying an AC voltage to less than all the divided electrodes of both ends, two stoppers attached on both ends of the piezoelectric vibrator through washers, a roller arranged in a position spaced from the stator, and a chain hung on the stator and the roller, whereby the chain is driven by the circumferential progressive wave of the stator and the roller is rotated by movement of the chain.

* * * * *